United States Patent [19]

Howeth

[11] Patent Number: 4,661,131
[45] Date of Patent: Apr. 28, 1987

[54] BACKFLUSHED AIR FILTERS

[76] Inventor: D. Franklin Howeth, 233 Chuck Wagon Trail, Fort Worth, Tex. 76108

[21] Appl. No.: 782,952

[22] Filed: Sep. 30, 1985

Related U.S. Application Data

[63] Continuation-in-part of Ser. No. 549,963, Nov. 7, 1983, Pat. No. 4,544,389, and a continuation-in-part of Ser. No. 680,942, Dec. 12, 1984.

[51] Int. Cl.$^4$ ............................................. B01D 46/04
[52] U.S. Cl. ........................................ 55/302; 55/521
[58] Field of Search ................ 55/273, 284, 302, 303, 55/521, 529

[56] References Cited

U.S. PATENT DOCUMENTS

| | | | |
|---|---|---|---|
| 3,436,899 | 4/1969 | Pausch | 55/302 |
| 4,218,227 | 8/1980 | Frey | 55/302 |
| 4,331,459 | 5/1982 | Copley | 55/273 X |
| 4,359,330 | 11/1982 | Copley | 55/273 |
| 4,452,616 | 6/1984 | Gillingham et al. | 55/302 |
| 4,455,823 | 6/1984 | Bly et al. | 55/521 X |
| 4,486,205 | 12/1984 | Nishiyama | 55/302 |
| 4,544,389 | 10/1985 | Howeth | 55/302 |
| 4,560,396 | 12/1985 | O'Dell | 55/302 X |

Primary Examiner—Robert Spitzer
Attorney, Agent, or Firm—Hubbard, Thurman, Turner & Tucker

[57] ABSTRACT

Disclosed are pleated paper barrier type air filter elements having planar filter panels that are cleaned by a reverse air jet cleaning system which includes one or more specifically shaped cleaning air manifolds or heads in which a plurality of jet nozzles or orifices are arranged in a predetermined pattern to provide a totally enveloping air jet which is discharged into a flow tube immediately downstream of the clean air flow chamber of a generally tubular filter element. The jet pattern provides a temporary pressure seal within the flow tube and entrains a substantial amount of ambient air into the reverse flow jet to thoroughly flush elements to clean dust cake from the exterior surfaces thereof. The multiple jet arrangement reduces the overall space occupied by the reverse jet cleaining system and provides a larger mass flow of cleaning air. Multiple jet orifice heads or manifolds may be configured in virtually any geometric shape to provide a desired jet pattern. The planar filter panel elements allow high media face velocities with low flow tube velocities. Oval filters are provided which have a greater clean air flow area than a plurality of cylindrical elements fitted within the same dimensional envelope.

22 Claims, 15 Drawing Figures

| X | L | W | $A_o/A_c$ | $P_o/P_c$ |
|---|---|---|---|---|
| 2 | 18 | 8 | 1.5/1 | 1.03/1 |
| 3 | 28 | 8 | 1.7/1 | 1.04/1 |
| 4 | 38 | 8 | 1.8/1 | 1.05/1 |
| 2 | 22 | 10 | 1.46/1 | 1/1.02 |
| 3 | 34 | 10 | 1.6/1 | 1/1.01 |
| 4 | 46 | 10 | 1.69/1 | 1/1.03 |
| 2 | 26 | 12 | 1.39/1 | 1/1.06 |
| 3 | 40 | 12 | 1.5/1 | 1/1.08 |
| 4 | 54 | 12 | 1.58/1 | 1/1.09 |

BACKFLUSHED AIR FILTERS

CROSS REFERENCE TO RELATED APPLICATION

This application is a continuation in part of copending application Ser. No. 549,963 Filed Nov. 7, 1983, U.S. Pat. No. 4,544,389, and a continuation in part of copending application Ser. No. 680,942 filed Dec. 12, 1984.

BACKGROUND OF THE INVENTION

1. Field of the Invention

The present invention pertains to porous media type air filter units having filter elements with full bore flow tubes including planar filter panels and oval shaped filter elements and multiple jet reverse flow cleaning systems for the filter elements wherein a substantial volume of jet cleaning air and entrained ambient air is used to flush the filter elements to remove accumulated dust particles.

2. Description of the Prior Art

The configuration of conventional air filter elements, being of substantially cylindrical annular pleated paper or cloth bag or being of V-shaped segmented bore, dual panel type structures has resulted in the development of reverse air flow cleaning systems wherein a jet nozzle is disposed in or somewhat downstream of the inner clean air chamber defined by the filter element and aimed in the opposite direction to that of the clean air flow through the filter element itself. The single jet nozzle is typically adapted to provide a short burst or pulse of pressure air to create a pressure wave which flows through the filter element in reverse direction to dislodge or remove the dust which has accumulated on the surface of the element itself.

The conventional design of reverse flow cleaning systems relies on the concept of delivering a relatively high pressure pulse of pressure air in the range of 80–100 psig and of very short duration. However, with high pressure air pulse type reverse flow cleaning systems a relatively inefficient process is carried out and the reverse flow pressure wave unduly stresses the filter media. In order to overcome the problems with prior art systems certain types of barrier filter elements such as the cylindrical porous media pleated paper type have been grossly derated as to their filtering capacity to prevent early filter element deterioration and failure due to the reverse pulse jet action. One prior art type of filter cleaning system disclosed in Frey U.S. Pat. No. 4,218,227 pleated paper porous media elements and requires derating of the cylindrical element for most applications to a maximum capacity of 1–3 cubic feet per minute of filter air flow per square foot of filter surface area.

In the system of Frey U.S. Pat. No. 4,218,227, the air discharging from the cylindrical bore of the pleated filter at a velocity of 500 to 1,000 feet per minute depending upon the filter media face velocities, which range from 1–3 feet per minute. The velocity pressur due to the exiting flow stream is about 0.015 to 0.150 inches of water. The losses associated with such velocity pressure are very low and are desirable. The reverse flushing flow tube or venturi of the system of the '227 patent, which is mounted over the discharge end of the filter bore, is by necessity reduced in diameter relative to the filter bore in order to accommodate the eductor action for the single jet reverse flushing process. This flow tube reduction tends to reaccelerate the filter bore discharge air stream, thus generating an undesirable energy loss. Advances in self-cleaning air filter technology permit media face velocities in excess of the 1–3 feet per minute of the system of the '227 patent. However, media face velocities in excess of 3 feet per minute leads to undesirably high exit velocity from the bore of the filter element, which leads to higher energy losses in current self-cleaning filter systems. system disclosed in Copley U.S. Pat. No. 4,359,330, provides for a cross draft flow stream passing perpendicular to the pulse jet discharge and across a zone of the filter media exterior. The purpose of the cross draft, which flows parallel to the media pleat folds, is to facilitate movement of loosened particles from the face of the panel filter.

Copley obviously has added energy through inclusion of the cross draft flow stream which in turn augments the energy from the pulse jet shock wave. It is noted however that this system as well as other cleaning enhancement means disclosed by '330, provide for the filter pleat folds to be perpendicular to the energy discharge from the pulse jet. This jet to pleat fold tends to remove particles from one outward facing pleat and subsequently impinge the particle into the next opposing outward facing pleat.

Obviously, the planar panel, energy augmented, pulse jet cleaning system is somewhat complex relative to the straight-forward pulse jet cleaning disclosed by Frey. The lack of pleat fold orientation relative to the pulse jet flow stream would add to cleaning problems.

Another problem associated with prior art air filter systems and of the type having reverse flow filter cleaning is the amount of space occupied by the air filter elements and by the reverse flow jet nozzle and associated structure, particularly as the size of the filter element itself increases. Since the cabinet structrue around the filter element and the element itself are desirably kept at a minimum size for a given filtering capacity, prior art pulse type air jet cleaning systems have occupied a disproportionately large amount of space in the filter cabinet structure which is not used to any other advantage.

The capabilities of prior art reverse jet filter cleaning apparatus has also limited the configuration of the filter element and the filter flow area for a given filtering capacity and the flow area of the clean air discharge conduit or flow tube associated with the filter element. For example, known types of reverse jet filter cleaning systems have been confined to use with filter elements which are substantially cylindrical tubular structures since the pulse delivered by a single jet nozzle will not conform to the shape of an irregular or noncircular filter cross-sectional shape and produce effective cleaning of the entire filter surface. Such is the example of U.S. Pat. No. 4,359,330, wherein a flushing jet diffuse is placed over the rather square discharge flow tube, wherein the pulse air from the single jet is diffused to optimize its efficiency in releasing particulate matter from the filter. Copley offers an alternate means wherein the single conical pulse jet is released through a somewhat square operative into the flow tube. Obviously, both measures present problems relative to flow restrictions and the ability to encompass the flow tube opening with the air pulse. Perhaps the filter cleaning energy augmentation systems disclosed by Copley are directly related to their problems.

The aforementioned problems in the art of porous media air filters including reverse jet cleaning systems therefor, together with the recognition of the need to provide a filter structure which has a maximum filtered air flow area, provides for a minimum filtered air pressure drop for a given filtering requirement, and a more thorough reverse flow cleaning system which will minimize stress on the filter media, has led to the development of the present invention.

SUMMARY OF THE INVENTION

The present invention provides improved configurations of pleated paper or similar porous media type air filter apparatus and a reverse air jet cleaning system for backflushing the filter elements.

In accordance with one aspect of the present invention there is provided a reverse air flow cleaning system in combination with a porous media air filter unit wherein a plurality of air jet nozzles or orifices are arranged in a configuration which will provide a reverse flow jet which is in substantial engagement with the peripheral wall of a flow tube downstream of the filter element to create a pressure seal and to entrain a relatively large quantity of ambient air to provide a thorough flushing action to clean accumulated dust and other debris adhering to or caked on the surface of the filter element itself.

In accordance wtih another aspect of the present invention there is provided a reverse flow cleaning system wherein an arrangement of jet nozzles or orifices is provided in a head or manifold housing in a pattern which will substantially envelop the cross-sectional flow area of an irregularly shaped conduit or conduit segment which is provided for conducting clean air away from the interior clean air flow chamber of a porous media barrier type filter element. The multiple jet nozzle arrangement is configured to provide a diverging jet flowstream which will entrain a substantial amount of ambient air to flow in the reverse direction through the filter element to throroughly flush the element as opposed to shocking or pulsing the element structure. This type of action precludes the needs of particulate removal enchancing means and provides for more thorough cleaning of the element surface and reduces the stress induced on the filter element as compared with the relatively intense high pressure shock wave induced by prior art type reverse jet cleaning systems. Accordingly, in the case of the porous pleated paper type elements, for example, the filter capacity can be updated to a range of at least 4-5 cubic feet of air flow per minute per square foot of filter area and also using sources of reverse jet pressure air at substantially lower pressures.

In accordance with another aspect of the present invention there is provided a reverse jet cleaning system for an air filter element which is configured to minimize the space occupied by the reverse jet cleaning system and to provide an unobstructed filter discharge flow conduit or tube downstream of the filter element which is larger in cross-sectional flow area than provided by prior art structures. The multiple jet reverse flow cleaning system of the present invention also provides for using filter elements which are larger in diameter for a given total filter area than prior art filter elements thereby further reducing some of the exterior dimensions of the filter unit which are desirably minimized.

In accordance with still a further aspect of the present invention a reverse flow cleaning system and associated structure are provided for porous media type filter units wherein a relatively compact reverse jet cleaning air supply manifold is arranged substantially concentrically around the clean air flow tube downstream of the filter element and is in supportive relationship to a plurality of conduits supporting specially shaped cleaning air jet discharge manifolds or housings in which a predetermined pattern of cleaning air jet nozzles or orifices are arranged.

In accordance with a further aspect of the present invention there is provided a filter unit having an element with an unobstructed flow tube defined at least in part by a planar filter panel that will permit filter media face velocities within the range of 5 to 15 feet per minute while keeping the flow tube discharge velocities within the range of 500 to 1,500 feet per minute which is comparable to earlier technology which permitted only 1-3 feet per minute media face velocities. By maintaining the filter panel height within the range of about 1.25-7.5 times the discharge flow tube opening width, the flow tube discharge air velocity pressure may be maintained within the desired 0.015-0.150 inches of water range.

In accordance with yet a further aspect of the invention, the panel filter flow tube may be tapered inwardly away from the unobstructed flow tube opening wherein the panel filter forms the hypotenuse of a right triangle which is 1.25-7.5 times the length of the leg formed by the flow tube openings. Thus, the air flow velocity through the tapered flow tube is uniform over the length of the flow tube. Moreover, the unobstructed tapered flow tube in combination with the multiple jet flushing system permits the multiple jet flushing head to be aligned perpendicular to the unobstructed flow tube opening thereby to allow the reverse flushing jets to act not only as an air eductor to generate a reverse flow of high energy air, but also to allow the velocity pressure of the flushing air jets to impinge directly upon the entire face of the filter panel to provide added cleaning efficiency.

In accordance with another aspect of the invention, the pleat folds of the planar filter are oriented parallel relative to height of the flow tube and relative to the axis of the reverse flushing flow stream wherein the forces of the flushing action are applied evenly to the inner faces of the pleat fold to accordingly impart a uniform force to particles accumulated on the upstream side of the filter media.

The present invention also provides for an improved oval configuration of pleated paper or similar type media air filter elements having a greater downstream or clean air discharge flow area as compared with a plurality of generally cylindrical pleated paper type filter elements which would fit within the same overall dimensional envelope when both filter configurations are rated at the same volume flow rate of air per unit area of filter media. In accordance with the invention an oval type filter element is provided in the same envelope as a plurality of cylindrical filter elements having the same filter media configuration and wherein the oval filter provides for a substantially lower volume of air flow per square inch of downstream or filter discharge chamber flow area thereby resulting in substantially less energy loss and lower filter pumping system power requirements. Conversely, if the same enery loss resulting from the so-called downstream flow area of the filter is to be maintained as compared with either an elongated cylindrical bag type filter or a multiple arrangement of cylindrical pleated media type filter elements an oval filter may be provided which is of a desired length for use with a reverse air flow flushing system in accordance with the present invention.

The advantages derived from the present invention include the provision of a filter unit having a relatively large filter area for a given overall dimensional envelope or bulk. The improved filter element configuration and the filter cleaning system enables the design of a filter unit having a lower filtered air pressure drop through the filter element for a given flow of air or other fluid to be filtered. The improved jet nozzle configurations and its relationship to the air flow structure downstream of the filter element also provides for entraining a larger volume of so called ambient air with the reverse flow jet to more thoroughly flush or flood the filter element which will assure more thorough cleaning of the element. The air flow rate through the filter elements may be increased as compared with prior art derated filter elements without decreasing filter element service life. Lower reverse jet air pressures are required thereby reducing energy requirements and stress levels on the filter elements.

The aforementioned aspects of the present invention together with other superior features will be appreciated by those skilled in the art upon reading the detailed which follows.

DESCRIPTION OF THE PREFERRED EMBODIMENTS

Figure 1:
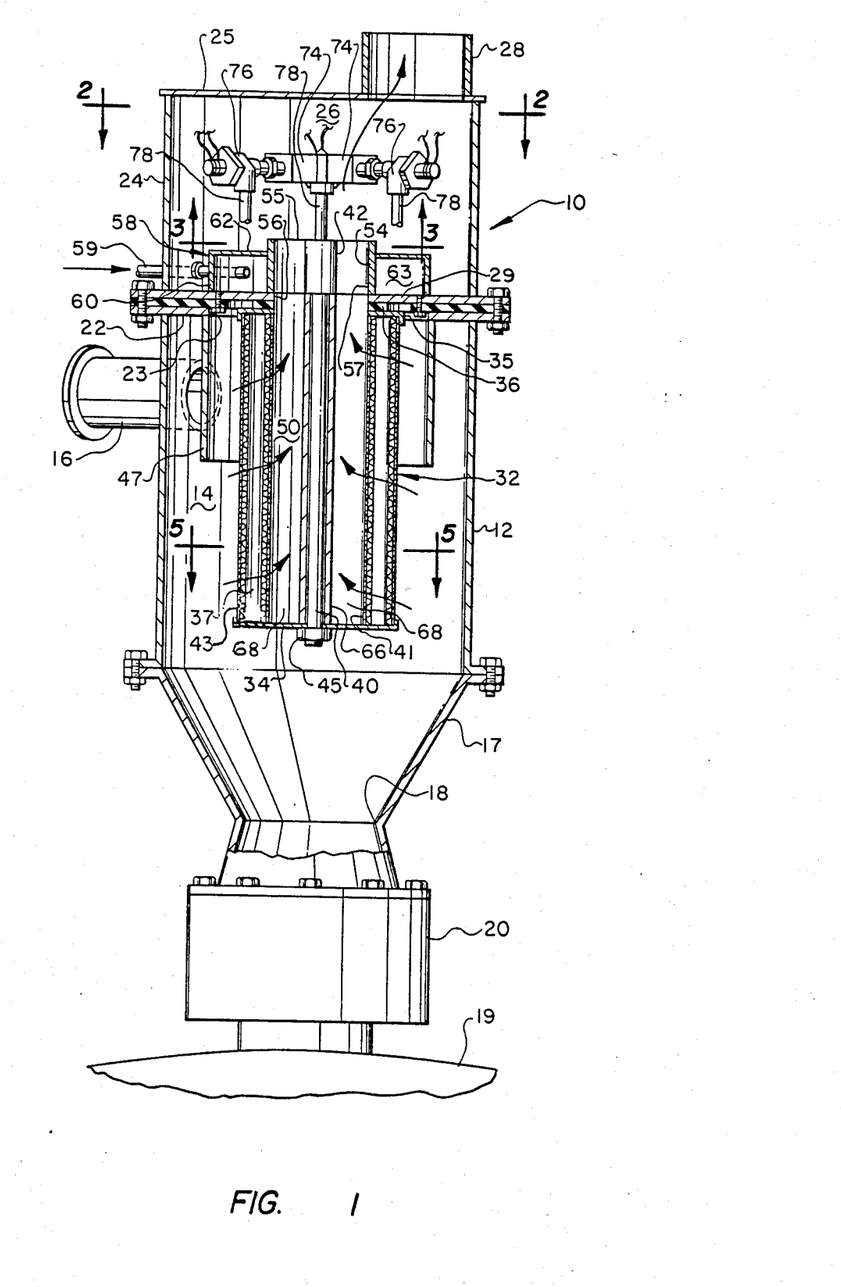
FIG. 1 is a vertical longitudinal section view of an air filter unit including the multiple jet reverse flow cleaning system.

Referring to FIG. 1, there is illustrated an air filter unit 10 including a substantially cylindrical filter housing 12 having an interior chamber 14 into which dust laden air is introduced by way of an inlet conduit 16. The housing 12 includes a lower section 17 having a bottom dust discharge opening 18 which may be in communication to a dust receiver tank 19 by way of a valve device 20. Periodically, the valve 20 is opened to discharge a quantity of accumulated dust into the tank 10. The housing 12 includes a transverse endwall 22 at the opposite end from the dust discharge opening 18 and an a clean air discharge housing or shroud 24 suitably mounted on top of and secured to the endwall 22 and forming a clean air discharge chamber 26. The housing 14 includes a top wall 25 which is suitably removable from the remainder of the housing to provide access to the chamber 26. Clean air exiting from the filter unit 10 flows through a clean air discharge conduit 28 to atmosphere or to other suitable conduit means, not shown, depending on the application of the filter unit.

Figures 2, 3, 4, 5, 6:
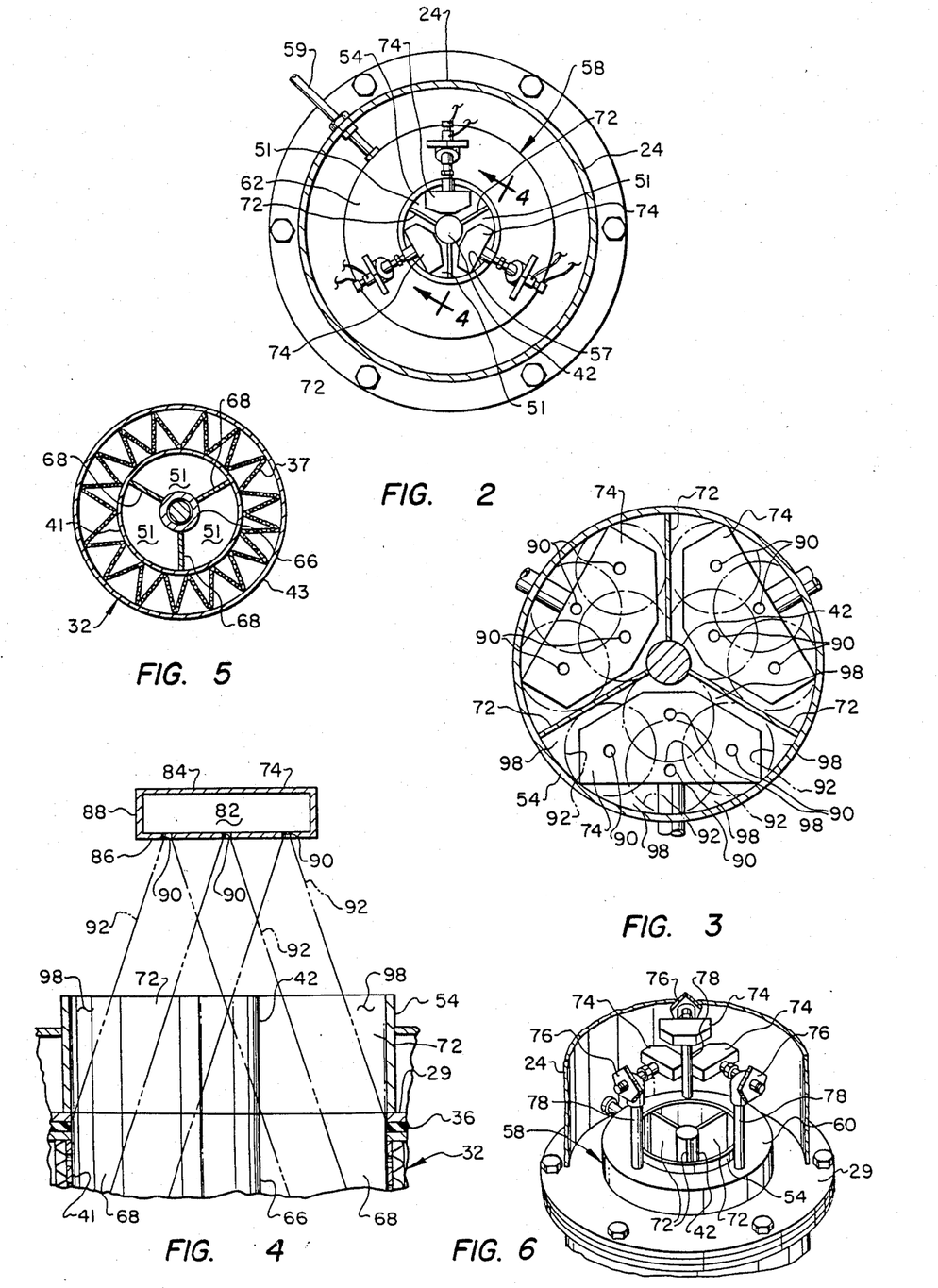
FIG. 2 is a section view taken substantially from the line 2—2 of FIG. 1.
FIG. 3 is a detail section view on a larger scale and taken from line 3—3 of FIG. 1.
FIG. 4 is a detail section view taken along line 4—4 of FIG. 2.
FIG. 5 is a section view taken along line 5—5 of FIG. 1.
FIG. 6 is a detail perspective view of the reverse jet supply and discharge manifold arrangement.

Referring to FIG. 5 also, the filter unit 10 is of a type which utilizes a porous media or so called barrier type filter element, 32. The filter element 32 may be constructed in accordance with one of several known techniques and preferably comprises a generally cylindrical tubular pleated paper member 37, or a fabric tube, not shown, supported by suitable reinforcing structure. The filter element 32 includes a bottom wall 34 and an opposed top wall 35, both of which may be separate from the element itself or form an integral part thereof. The filter element 32 is supported in sealing engagement with a transverse endwall 29 by way of a cylindrical ring gasket 36 disposed between the top wall 35 and the endwall 29 to form a fluid-tight seal.

The filter element 32 is adapted to be supported within the chamber 14 by suitable means such as, for example, an elongated tie rod 40 integrally formed with a hub part 42 supported on the housing section 24. The rod 40 extends through the bottom wall 34 and is threadedly engaged with a nut 45. The filter element 32 may be installed in the chamber 14 by first removing the housing section 12 from the housing section 17, for example, or by removing the housing section 24 from the housing section 12. The interior chamber 14 is also provided with a dust deflecting shield 47 extending downward from endwall 22 and disposed around an opening 23 in the endwall. The shield 47 is also disposed around an uppper portion of the filter element 32 to prevent short circuit flow of dust laden air from the inlet conduit 16 directly into contact with the surface of the filter element. The filter element 32 operates to filter air flowing from the chamber 14 into an interior clean air chamber 50 for exit from the filter unit 10 in accordance with the flow arrows shown in FIG. 1 wherein air flows basically from the chamber 14, through the porous media of the filter element 32, into the chamber 50, then into the chamber 26 and out through the discharge conduit 28.

The filter element 32 functions to remove solid particles from the air flowing through the element by impingement of the particles on the outer surface of the element media. The media for the element 32 is shown as the pleated paper cylinder 37, for example. The paper cylinder 37 is preferably supported by inner and outer cylindrical screenlike member 41 and 43. Dust particles typically accumulate on the exterior of the paper cylinder 37 until a substantially solid layer or cake is formed which must be removed to allow the filter element to continue its function and to prevent a pressure differential between the chambers 14 and 50 which might result in the collapse of the filter element. It has been determined that, by providing a momentary reverse flow of relatively high pressure air in a jet or pulse type action, at least some of the accumulated dust may be forcibly removed from the filter element 32 and allowed to fall to the bottom of the housing 12 for discharge through the opening 18.

In accordance with prior art practice the reverse flow jet has been provided by mounting a nozzle substantially coaxial with the longitudinal axis or centerline of the filter element 32 and above, for example, the chamber 50. The aforedescribed prior art nozzle is suitable connected to a source of high pressure air by way of a power operated valve which is momentarily opened and closed to allow a pulse of high pressure air to flow reversely through the chamber 50 and to create a pressure wave in an effort to dislodge the aforementioned dust cake and clean the filter element. This prior art type of reverse jet cleaning apparatus requires a relatively constricted filtered air discharge flow tube for conducting clean air from the chamber 50. The aforementioned type of flow tube forms an undesirable flow restriction in the flow path of air being cleaned to thereby dictate higher power requirements for the filtered air in forced flow systems. Moreover, prior art arrangements of reverse flow jet nozzles have also necessitated a relatively large housing part 24 and comparable to the size of the housing section 12 thereby having an overall height which undesirably increases the space occupied by the filter unit.

However, in accordance with the present invention a substantially improved jet nozzle filter element cleaning system has been developed by providing multiple jets of pressure air arranged in such a way as to expand preferably into contact with the peripheral walls of a clean air discharge flow conduit downstream of the chamber 50 in the direction of flow of clean air out of the filter unit. Thanks to the relatively large surface area formed between the multiple jets and the "ambient" air in the chamber 26 the improved jet nozzle configuration provides for entraining a relatively large amount of this ambient air to flow reversely through the chamber 50 and into the chamber 14 to thoroughly flood the filter element 32 and thereby remove substantially all of the dust or accumulated particulate matter on the outer surface of the element.

Referring further to FIGS. 1 and 2, the reverse jet filter cleaning system includes a relatively large diameter flow tube 54 extending from an opening 56 in the endwall 29 vertically upward a relatively short distance to an end face 55. The flow tube 54 is of a diameter such that an inner wall surface or bore 57 forms a passage of approximately the same flow area as the chamber 50 defined by the inner diameter of the filter element 32. The flow tube 54 is surrounded by a cylindrical annular reverse jet air supply manifold 58 including a sidewall 60, a top wall 62, a portion of the endwall 29 and a portion of the flow tube 54 to form an annular manifold chamber 63. Pressure air may be supplied to the manifold 58 by a conduit 59 extending through the outer sidewall of housing 24 as shown in FIG. 2. Referring to FIG. 5, also, the chamber 50 is divided into a plurality of subchambers 51 by a divider structure comprising a central tubular member 66 disposed around the rod 40 and three radially extending partition plates 68 which project outward and are substantially contiguous with the inner sidewall 41 of the filter element 32.

The divider structure includes a portion which is formed in the flow tube 54 and comprises three circumferentially spaced apart radially projecting partition plates 72, FIG. 3, aligned with the respective plates 68. The plate 72 are suitable joined to and project outward from the hub part 42. The portion of the divider structure comprising the tube 66 and plate 68 may be formed integral with the hub part 42 and plates 72. Although the chamber 50 and the interior of the flow tube 54 are thus divided into three aligned subchambers, those skilled in the art will appreciate from the description herein that the chamber 50 may be divided into fewer or greater numbers of subchambers by a similar type of divider structure.

As shown in FIGS. 1, 2 and 3, the reverse flow filter cleaning system is further characterized by an arrangement of three cleaning air jet discharge heads or manifolds 74 which are disposed directly above the flow chambers 51, respectively, and are each connected to a quick opening high flow rate pilot operated valve 76 for receiving a substantially unrestricted flow of high pressure air from the manifold 58 by way of respective conduits 78. The valves 76 are of a type commercially available and may comprise a model 835633 manufactured by Automatic Switch Co. of Florham Park, N.J. U.S.A. Each of the conduits 78 comprises a substantially rigid conventional metal pipe or tube which is suitably supported on the supply manifold top wall 60, as shown in FIG. 6, and supports the respective valves 76 and the manifolds 74 which are mounted in cantilever fashion extending directly above the subchambers 51. The valves 76 are each adapted to be opened and closed in timed relationship to each other by way of a suitable control unit, not shown. Suffice it to say that the aforementioned control unit may be adapted to provide for opening and closing the respective valves 76 in a predetermined sequence for a predetermined duration for allowing high pressure air to flow from the manifold 58 into and through the manifolds 74, respectively.

Referring now to FIGS. 3 and 4, in particular, each of the air discharge manifolds 74 is characterized as a shaped housing having an interior manifold chamber 82 delimited by top and bottom walls 84 and 86 and a peripheral sidewall 88. The bottom wall 86 has a plurality of relatively sharp edged nozzles or orifices 90 formed therein in a predetermined pattern to develop a plurality of overlapping frusto-conical jets, indicated schematically in FIG. 4 and designated by the numerals 92. The specific configuration of the jets 92, comprising a diverging flow of high velocity pressure air, may vary in accordance with the distances of the bottom wall 86 of the manifold 74 to the flow tube 54, the geometrical shape of the orifices 90 and the geometrical arrangement of the orifices on the bottom wall 86, and other principles of fluid mechanics relative to jet stream air flow eductors. However, for purposes of description herein the jets 92 are assumed to have fairly well defined conical shapes of an included angle of about 18 degrees which extend in overlapping relationship to each other and which diverge until they contact the wall surfaces of the partition plates 72 and the interior wall surface 57 of flow tube 54. The boundaries of the jets 92 which are designated by the conical line are, of course, not quite as sharply defined as indicated in FIG. 4. However, the air flow within the generally conical envelope defining the jets 92 is of very high velocity and therefore tends to entrain the relatively stationary or ambient air outside of the jet boundary. This entrainment adds substantially to the mass of air being directed into the subchambers 51 to flow out through the filter element 32.

In accordance with an important aspect of the present invention it has been determined that an optimum location of the cleaning air discharge manifolds or heads 74 is such as to produce jets 92 which impinge the interior wall surface of the flow tube 54 and the plate 72 just above or at the juncture of the flow tube with respect to the filter element 32. The point of contact of the jets 92 with the flow tube 54 may be further along the tube toward its discharge end but the air entrainment capability of the jets increases with their placement as shown. In the arrangement illustrated, the flow tube 54 actually does not in itself extend to a point contiguous with the filter element 32 but the openings in the endwalls 22 and 29 and the gasket 36 effectively form an extension of the flow tube. For purposes of discussion herein the term downstream as used throughout the specification and claims refers to the direction of normal flow of air to be cleaned through the filter system as previously described. By positioning the manifolds or heads 74 so that the reverse flow cleaning air jets are contiguous with the walls of the flow tube 54 and the plates 72 at or slightly downstream of the juncture of the flow tube with the filter element 32 a "seal" is provided which prevents air from escaping downstream around the periphery of the jets and along the interior sidewalls of the flow tube toward the chamber 26 during discharge of the jets 92.

Moreover, the generally triangular shaped areas 98 formed around the portions of the subchambers 51 defined by the overlapping jets 92 and the walls of the flow tube 54 and the partition plates 72 increases the area available for entrainment of ambient air with the jetted air to increase the mass flow of cleaning air which is forced to flow reversely through the filter element 32. Those skilled in the art will appreciate that the configuration of the nozzles or orifices 90 and their specific pattern will not necessarily form a precisely defined jet having a cross-sectional area corresponding exactly to the cross-sectional area of the flow path of the jet. However, as the jets 92 diverge into contact with the inner wall surface of flow tube 54 and the surfaces of the plates 72, for example, the configuration of the jets will be deflected or deformed somewhat as they contact these surfaces so that, at a point just downstream of the juncture of the flow tube 54 with the filter element 32, the air flow throughout the cross-sectional area is virtually totally in a direction opposite to that of the normal flow of air being cleaned through the flow tube.

One important advantage of the multiple jet arrangement for reverse flow cleaning air is that the manifolds or heads 74 may be disposed closer to the top of the flow tube 54 than with prior art single orifice reverse flow air jet systems. Moreover, the provision of multiple reverse flow jets increases the overall surface area or interface between the fast moving jet flow of air and the relatively stationary ambient air to increase the amount of ambient air entrained with the propulsion or jetted air. Another advantage derived from the arrangement described herein is that the flow tube 54 may be made larger in cross-sectional flow area, thereby reducing the pressure drop or resistance to flow of the air being cleaned as it flows through the filter element 32 and from the chamber 50 into the chamber 26. Although it is assumed that the jets 92 emerging from the orifices 90 diverge in such a way as to form a cone having an included angle of approximately 18 degrees, the geometrical shape configuration of the nozzles or orifices 90 and the geometrical arrangement of the orifices and the distance of travel of the jetting stream from point of discharge from the bottom wall 86 to contact the inner wall surface of flow tube 54 and surface of plates 72, will determine the specific shape of the jets as they diverge to seal the flow tube opening 54.

The operation of the multiple jet reverse flow cleaning system described herein in conjunction with FIGS. 1 through 6 is believed to be readily understandable from the foregoing description. However, briefly, the system is operated by timed opening and closing of the respective valves 76 to emit relatively large volumes of pressure air at pressures in the range of 15 to 60 psig for discharge from the supply manifold 58 into the respective jet discharge manifolds 74. The duration of the open condition of the respective valves 76 is controlled to assure that a substantial flushing or flooding action of the reverse flow cleaning air is carried out as opposed to the quick pulse or shock type action provided by prior art type reverse air flow filter cleaning systems. Moreover, the nominal pressures of the jet cleaning air are preferably 20 to 40 psig which is significantly less than that required by prior art systems.

Figure 7:
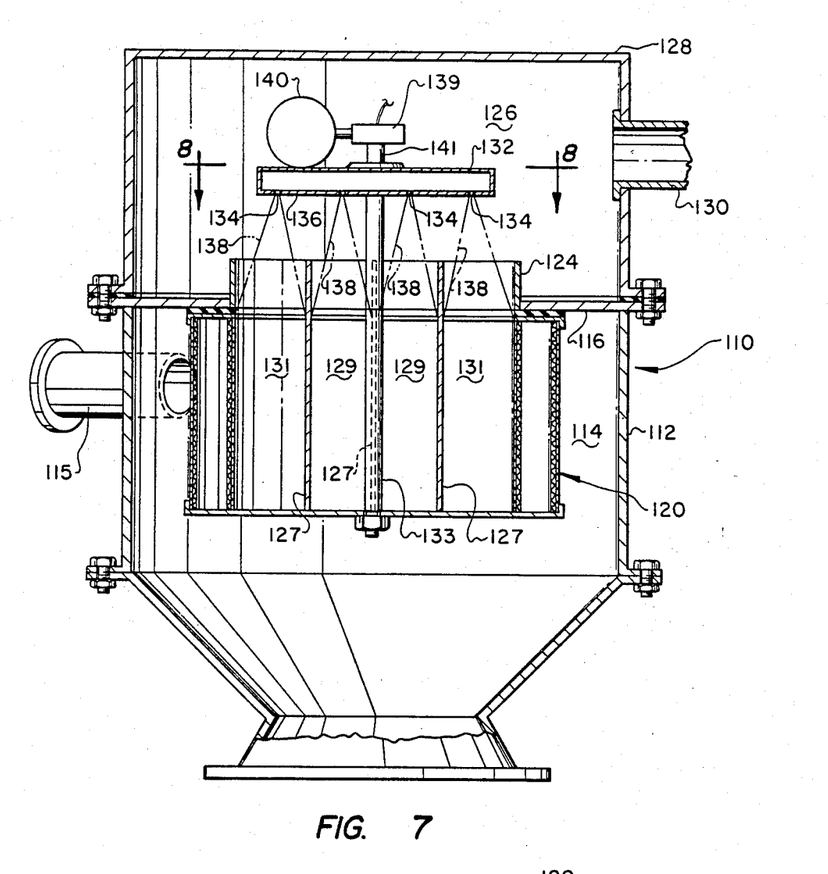
FIG. 7 is a vertical longitudinal central section of an embodiment of a mulitple jet reverse flow cleaning system of the present invention and taken along the line 7—7 of FIG. 8.
Figure 8:
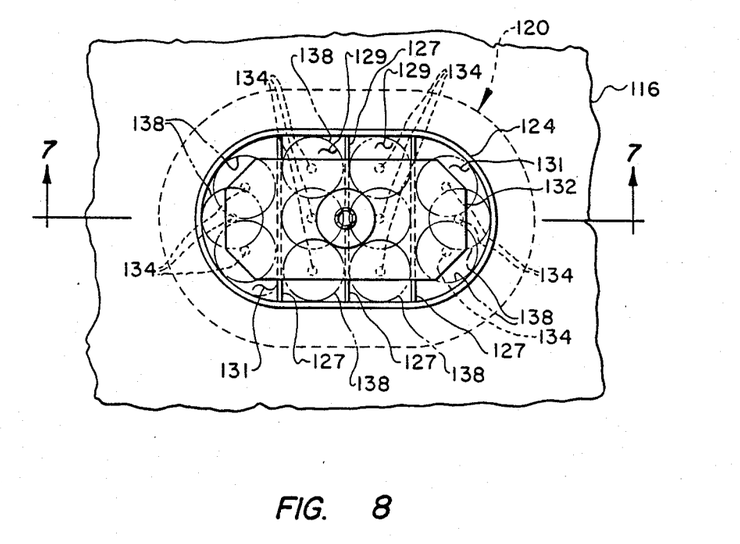
FIG. 8 is a section view taken from the line 8—8 of FIG. 7.

In accordance with another important aspect of the invention provided by the mulitple jet discharge manifolds 74, the specific configuration of the filter element and the reverse flow jet itself may be varied. The filter element itself may be virtually any shape and may be a substantially planar member, for example, as long as a barrier is formed between the clean air chamber and the contaminant side or chamber. Referring to FIGS. 7 and 8, for example, there is illustrated a filter unit 110 having a housing 112 forming a flow chamber 114 and a transverse endwall 116 partially defining the chamber. Dush laden air is admitted to the chamber 114 through an inlet conduit 115. A substantially elongated oval tubular or perimeter type filter element 120 is suitably mounted in the housing 112 and is supported therein in a manner similar to the way in which the filter element 32 is supported. The filter element 120 defines, in part, a clean air flow tube which is formed by a plurality of sub-flow tubes 129 and 131 through which filtered air flows into and through an elongated oval flow tube 124 into a chamber 126. The chamber 126 is defined in part by a housing 128 similar to the housing 24. Filtered air is discharged from the chamber 126 through a suitable conduit 130.

The filter unit 110 is provided with a reverse jet cleaning air discharge manifold 132 suitably mounted on a support tube 133 which extends centrally through the flow tube extension 124 and is supported by one of a plurality of partitions 127 extending through the flow tube extension and dividing the flow tube into the chambers 129 and 131. The manifold 132 is spaced from the end of the tube 124 and is directly in line with the flow path of air passing through the flow tube. A plurality of jet nozzles or orifices 134 are formed in a bottom wall 136 of the discharge manifold 132 to form overlapping conical air jets 138 which may be periodically created by discharging pressure air into the discharge manifold 132 through a quick opening valve 139 in communication with the head by way of a conduit 141 and with a pressure air supply manifold or conduit 140. The manifold 132 is also positioned with respect to the flow tube 124 and the partitions 127 so that the diverging jets 138 contact the sidewalls of the flow tube and the partitions just downstream of the juncture of the flow tube with the filter element 120 whereby a substantial "seal" is formed during the existence of the jets to prevent leakage of pressure air between the jets and the sidewalls of the flow tube. As with the embodiment described hereinabove in conjunction with FIGS. 1 through 6, the formation of the multiple jets 138 increases the surface area of the jet boundary formed between the fast moving air flow stream and the relatively stationary ambient air mass around the jets. This provides for substantial entrainment of ambient air with the jets 138 to provide a thorough flushing or flooding of the filter element 120 during the reverse jet cleaning process.

As with the configuration of the heads or manifolds 74, the manifold 132 is also configured to provide the jet nozzle pattern required for a completely enveloping reverse flow stream that will result in a very efficient and thorough flushing of the filter element 120. The valve 139 is also adapted to be opened and closed by a suitable control circuit, not shown, having a timing or a filter pressure differential sensitive device therein for periodically opening and closing the valve.

Figure 9:
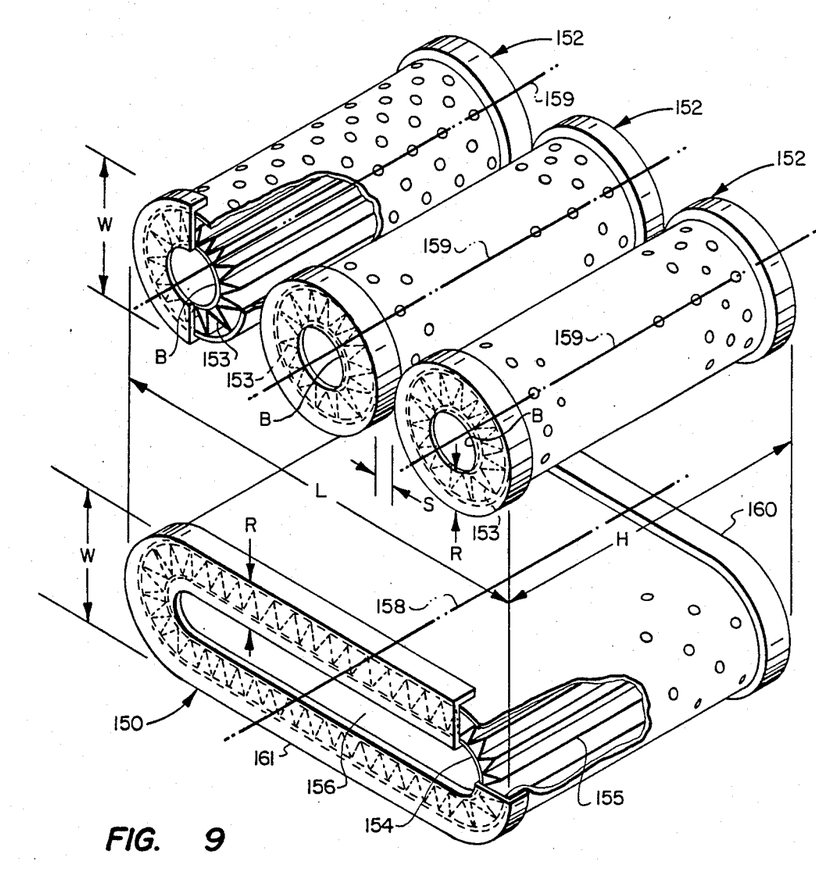
FIGS. 9 and 10 comprise diagrams illustrating a comparison between an improved oval filter element configuration shown in FIG. 9 and a plurality of cylindrical filter elements of similar construction.

Referring now to FIG. 9, the present invention contemplates the provision of an oval shaped filter 150 which occupies an envelope essentially no greater than a plurality of generally cylindrical filter elements 152 of construction substantially like that of the element 32. The oval shaped filter 150 has a substantially greater effective flow area for the outflow of filtered air and a filter media flow area substantially the same as a multiplicity of generally cylindrical filter elements which will fit in the same envelope and have the same configuration of filter media. The oval filter element 150 is constructed substantially like the oval filter element 120 and is provided with opposed transverse end caps 160 and 161. As illustrated in FIG. 9, it is assumed that a minimal spacing "S" of approximately two inches should be maintained between the plural, generally cylindrical elements 152 to thereby give an overall envelope lenght L. The envelope width W is equal to the diameter of the cylindrical filter elements 152 and the diameter of the opposite lateral ends 151 of the oval element 150. The filter elements 150 and 152 each have an overall length or height H. By way of example, it will also be assumed that the filter elements 152 are provided with filter media 153 comprising a pleated porous paper type element folded to have approximately 10 pleats per linear inch of length of the filter element as measured around the circumference of the bores B of the filter elements 152. The overall filtered air discharge outflow area for a configuration of plural cylindrical filter elements 152 will be assumed to have an area $A_c$ comprising the transverse area of one of the bores B multiplied by the number of filter elements in a particular arrangement. Moreover, the cumulative inner perimeter surface area per unit length of the filter elements 152 measured at bores B will be denoted as $P_c$.

The filter element 150 has the same overall length L, the same width W and the same depth or height H as the configuration of the plural filter elements 152. The filter element 150 also has a filter media 155 comprising a pleated paper member having the same pleat spacing along the perimeter 154 of the inner space or flow chamber 156 defined by the filter element and a radial pleat width R of about 1.0 inches, the same as the elements 152. Given the conditions stated hereinabove for a configuration of, by way of example, two, three, or four cylindrical filter elements 152 occupying an envelope having a length L, a width W and a height H, an oval filter element 150 having the same filter media configuration and occupying the same envelope of length L, width W and height H will have a cross-sectional flow area $A_o$ of the chamber 156 measured in a plane perpendicular to the central axis 158, which is greater than the cumulative flow area $A_c$ measured in a plane perpendicular to the axes 159 of the respective bores B of the elements 152.

Figure 10:
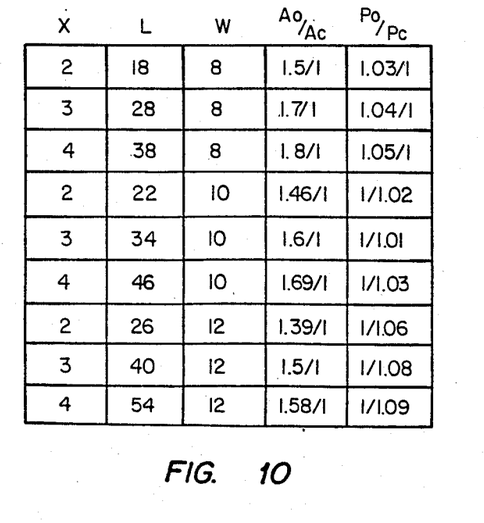

The ratio $A_o/A_c$ of the effective so called downstream flow area of the filter element 150 for an equivalent maximum array of cylindrical filter elements is illustrated in the chart of FIG. 10 for a multiple cylindrical element array "X" of 2, 3, or 4, cylindrical filter elements of length L and width W indicated in inches. The ratio $P_o/P_c$ is also given in the chart of FIG. 10 of the inner perimeter surface area $P_o$ of the oval filter element 150 to the cumulative inner perimeter surface area $P_c$ of the cylindrical filter elements 152 per unit of height H. It will be observed that in all instances the cross-sectional flow area for the outflow of clean air from within the chamber 156 and the chambers formed by the bores B is substantially greater for an oval filter 150 than that provided by a plurality of generally cylindrical filters 152 within the same envelope. Moreover, the total perimeter lengths or perimeter areas per unit height of the filter elements 150 and 152 are not substantially different as indicated by the column of ratios $P_o/P_c$ in FIG. 10. Accordingly, an oval filter such as the filter element 150 may replace a plurality of generally cylindrical filter elements which would fit within the same envelope delimited by the dimensions L, W and H and have a greater clean air discharge or outflow flow area of at least about 1.4 times the cumulative flow area of the cylindrical elements. Moreover the oval filter element 150 provides for less pressure or flow losses and has essentially the same filter element surface flow area.

Figure 11:
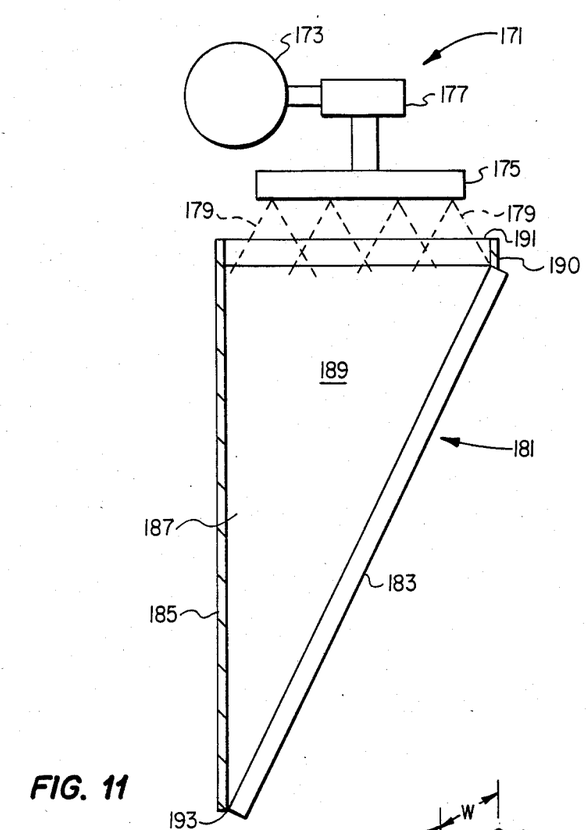
FIG. 11 is a schematic view of a multiple jet flushing system and filter element of the present invention.

Referring now to FIG. 11, there is illustrated in schematic fashion an alternative embodiment of the filter unit of the present invention. The filter unit incldes a compressed air flushing system, designed generally by the numeral 171, which includes a compressed air manifold or reservoir 173 which is arranged to supply compressed air to a multiple jet flushing heat 175 through a quick opening air valve 177. Flushing heat 175 includes a plurality of discharge nozzles, each of which emits a conical jet of compressed air 179.

The filter unit includes a filter element, designated generally by the numeral 181 appropriately mounted with respect to compressed air flushing system 171. Filter element 181 includes a planar filter panel 183 and a suitable housing which includes a back wall 185 and at least a pair of side walls, one of which is shown and designated by the numeral 187. Filter element 181, back wall 185, and the side walls, including side wall 187 define a clean air chamber 189. Air flows from the exterior of filter element 181 through filter panel 183 into chamber 189. Any dust in the air is deposited on the exterior surface of filter panel 183. Filter unit 181 includes a flow tube 190 at its open end. Flow tube 190 is of substantially the same size and shape as the open end of filter unit 181.

Filter panel 183 is canted inwardly toward back wall 185. Thus, flow tube 189 is tapered inwardly between an open flow tube opening 191 and a closed end 193. The vertical cross section of filter element 181 is thus a right triangle with filter element 183 forming the hypotenuse and back wall 185 and flow tube opening 191 forming the legs. The triangular cross section of filter element 181 provides cerain advantages. The width of flow tube 189 expands uniformly from zero at closed end 193 to its maximum width at flow tube opening 191. Thus, the volume of flow tube 189 likewise expands uniformly. Accordingly, a constant throughout flow velocity across filter panel 183 results in a uniform discharge flow velocity over the length of flow tube 189. Conversely, the uniformly decreasing width of flow tube 189 from flow tube opening 191 to closed end 193 presents a reducing volume chamber to receive the jets 179 educted flushing flow stream which induces acceleration of the filter cleaning flow stream through the panel 183. Additionally, since filter panel 183 is canted inwardly with respect to jets 179, the resulting velocity pressure of the combined jet flow stream impingement is more direct and greater flushing energy is transferred to filter panel 183, which results in more efficient dust cake removal. Additionally, the inward canting of filter panel 183 results in some gravitational assist in the dust cake removal.

Figure 12:
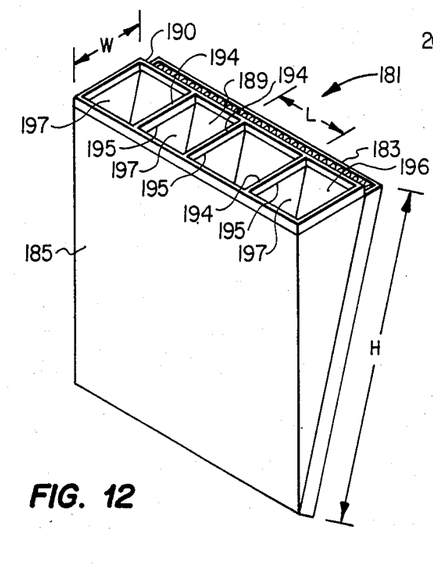
FIG. 12 is a perspective view of a filter element of the present invention.

Referring now to FIG. 12, filter element 181 is shown in perspective. Filter panel 183 is a rectangular pleated paper filter member having a height H and a length as long as desired. Flow tube 190 has a width W and a length equal to the length of filter panel 183. Flow tube 190 and chamber 189 are partitioned by a plurality of divider structures 194 and 195, respectively, into a plurality of subchambers 196 and tubes 197. Each sub-flow tube has a length L that is determined by the amount of flushing air available. Typically, filter panel 183 contains about 10 pleats per inch with a pleat height anywhere from 1.5 inches to 4 inches. Thus, the surface area of the filter element associated with any sub-flow tube 197 is equal to the product of twice the pleat height times the number of pleats per inch multiplied by L and H. The flow velocity through a filter media is equal to the flow rate divided by the surface area of the media. Presently available pleated paper filter media is capable of handling flow velocities in the range of 5 to 15 feet per minute. Accordingly, the values of H and L are shaped so as to achieve the appropriate flow velocity city.

The velocity pressure of air flowing out of a flow tube is proportional to the square of the flow velocity. The desired range of velocity pressure is 0.015-0.150 inches of water. That range of velocity pressure has been found to correspond to a flow velocity of between 500 and 1,500 feet per minute. It has been discovered in the present invention that the desired flow velocity range may be obtained with the rated 5-15 feet per minute media face velocity if panel height H is in the range of 1.25-7.5 times flow tube width W.

Again referring to FIG. 12, the rectangular panel 183, the fold of the pleat is parallel to H and presents a series of lateral openings between the pleats on the inner face of the panel 183 wherein the jets 179 induce the openings with a parallel stream of flushing air to remove particulate from the opposed lateral pleat openings on the outside of the panel 183. This desired orientation of pleat fold alignment consequently presents both faces of the inner fold with relatively equal flushing energy as opposed to pleat folds perpendicular to the flushing air stream.

Figure 13:
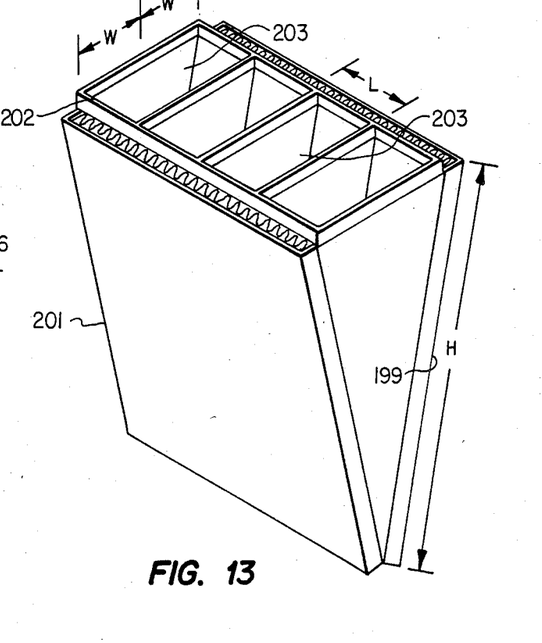
FIG. 13 is a perspective view of an alternative filter element of the present invention.

Referring now to FIG. 13, there is disclosed an alternative filter element which includes a pair of spaced apart inwardly canted filter panels 199 and 201. Each filter panel 199 and 201 is substantially similar to filter panel 183 and each is canted away from the center of the fitler element by an angle equal to the angle at which filter element is 183 is canted away from back wall 185. Thus, the maximum spacing between fitler elements 199 and 201 and width of flow tube 202 is equal to W. Again, the appropriate velocity range of 500 to 1,500 feet per minute is obtained out of each sub-flow tube 203 when H is in the range of 1.25–7.5 times W.

Figure 14:
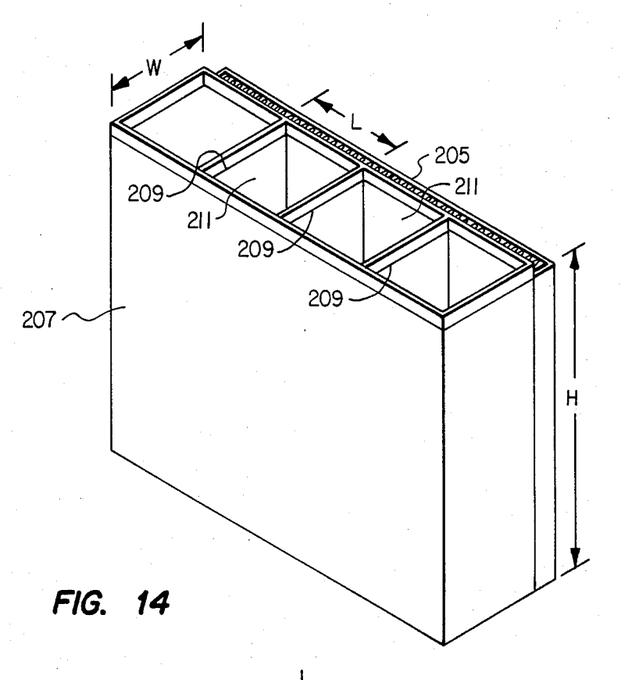
FIG. 14 is a perspective view of a further alternative filter element of the present invention.
Figure 15:
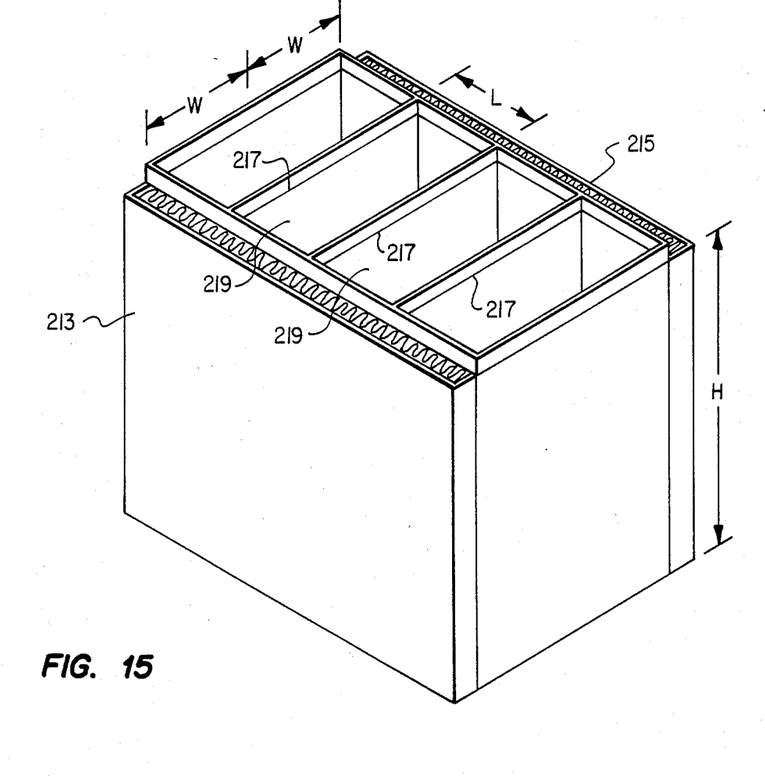
FIG. 15 is a perspective view of yet a further alternative filter element of the presenet invention.

Similarly, referring to FIGS. 14 and 15, there are disclosed filter elements having non-canted filter panels. In FIG. 14, a filter panel 205 having a height H is spaced a distance W from a back wall 207. A plurality of divider structures 209 are spaced a distance L apart between filter panel 205 and back wall 207 to define a plurality of subchambers 211. Again, the desired 500–1,500 feet per minute flow tube velocity is obtained with the rated 500–1,500 foot per minute media face velocity if the height H of filter panel 205 is in the range of 1.25 to 7.5 times flow tube width W. Similarly, in FIG. 15, there is shown a filter element including partial filter panels 213 and 215 spaced apart a distance equal to 2W. A plurality of divider structures 217 divide the filter element into a plurality of subchambers 219. In the embodiment of FIG. 15, panel height H is in the range of 1.25 to 7.5 times W.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A porous media barrier type air filter unit, said filter unit including:
    a housing forming a filter chamber including means for conducting dust laden air into said chamber;
    a porous media barrier filter element in said filter chamber, said filter element including a first planar filter panel, said filter panel defining at least in part a clean air chamber for receiving air which has flowed through said filter element, said clean air chamber having an opening for discharging clean air from said clean air chamber, and said filter element including a second planar filter panel spaced apart from said first filter panel, said second filter panel cooperating with said first filter panel to define at least in part said clean air chamber;
    means for supporting said filter element in said filter chamber;
    means forming a flow tube opening into said clean air chamber for conducting clean air from said clean air chamber and away from said filter element;
    reverse flow air jet nozzle means disposed downstream of said filter element with respect to the direction of flow of clean air through said filter element, said nozzle means being in communication with a source of pressure air and including a plurality of orifices arranged in a predetermined pattern for discharging a shaped jet of pressure air for contact with the walls of said flow tube, said nozzle means being arranged in such a way as to generate a jet having a cross-sectional shape conforming to the cross-sectional shape of said flow tube and for inducting a relatively large volume of substantially ambient pressure air into said flow tube in a direction opposite to the direction of flow of clean air out of said flow tube to backflush said filter element with a quantity of combined induced and jetted pressure air.

2. The filter unit as claimed in claim 1, including a divider structure disposed in said filter element having means for partitioning said flow tube and clean air chamber into a plurality of separate subchambers.

3. The air filter unit as claimed in claim 2, wherein said nozzle means are arranged so as to generate a jet having a cross-sectional shape conforming to the cross-sectional shape of said subchambers.

4. The air filter unit as claimed in claim 1, including a divider structure disposed in said filter element between said first and second filter panels and having means for partitioning said flow tube and clean air chamber into a plurality of separate subchambers having substantially rectangular cross-sections.

5. The air filter unit as claimed in claim 1, wherein said first and second filter panels are substantially parallel to each other.

6. The air filter unit as claimed in claim 1, wherein said first and second filter panels are canted inwardly toward each other so that the distance between said first and second filter panels decreases with increasing distance from said flow tube opening.

7. The air filter unit as claimed in claim 1, wherein said first filter panel has a height between 1.25 and 7.5 times the width of said flow tube opening.

8. The filter unit as claimed in claim 1, wherein said first filter panel and flow tube are arranged such that the flow tube discharge velocity is 500 to 1,500 feet per minute.

9. The filter unit as claimed in claim 1, wherein; said porous media for said first planar filter panel comprises a pleated porous paper, the pleated folds therein being parallel to axis of said shaped jet of pressure air.

10. The filter unit as claimed in claim 1 wherein;
said filter element has semi-cylindrical ends thereby to form an oval shape and includes a filter media having a flow area for air to be filtered substantially the same as the maximum number of cylindrical filter elements which an be contained in the same dimensional envelope as said oval filter element wherein said cylindrical filter element have an outer diameter the same as the width of said oval filter element, and said oval filter element has a cross sectional flow area of said clean air chamber of at least approximately 1.4 times the cumulative cross sectional flow area of the corresponding clean air chambers formed by said maximum number of cylindrical filter elements.

11. The filter unit as claimed in claim 10, wherein:
said filter media for said oval filter elements and said cylindrical filter elements comprises a pleated porous paper, the pleat spacing and pleat width being substantially the same for all of said filter elements.

12. A porous media barrier type air filter unit, said filter unit including:
a housing forming a filter chamber including means for conducting dust laden air into said chamber;
a porous media barrier filter element in said filter chamber, said filter element including a first planar filter panel, said filter panel defining at least in part a clean air chamber for receiving air which has flowed through said filter element, said clean area chamber having an opening for discharging clean air from said clean air chamber;
means for supporting said filter element in said filter chamber;
means forming a flow tube opening into said clean air chamber for conducting clean air from said clean air chamber and away from said filter element;
reverse flow air jet nozzle means disposed downstream of said filter element with respect to the direction of flow of clean air through said filter element, said nozzle means being in communication with a source of pressure air and including a plurality of orifices arranged in a predetermined pattern for discharging a shaped jet of pressure air for contact with the walls of said flow tube, said nozzle means being arranged in such a way as to generate a jet having a cross-sectional shape conforming to the cross-sectional shape of said flow tube and for inducing a relatively large volume of substantially ambient pressure air into said flow tube in a direction opposite to the direction of flow of clean air out of said flow tube to backflush said filter element with a quantity of combined induced and jetted pressure air, wherein said first filter panel is canted inwardlly with respect to said flow tube opening, whereby said jet of pressure air impinges directly upon said first filter panel.

13. The air filter unit as claimed in claim 12, including a divider structure disposed in said filter element and including a planar panel positioned with respect to said first filter panel to define at least in part said clean air chamber with said clean air chamber having a triangular cross-section.

14. The air filter unit as claimed in claim 13, wherein said triangular cross-section is substantially right triangular with said first filter panel forming the hypotenuse and said planar panel and flow tube opening forming the legs, respectively.

15. The air filter unit as claimed in claim 14, wherein the length of said hypotenuse is 1.25 to 7.5 times the length of the leg formed by said flow tube opening.

16. A porous media barrier type air filter unit, said filter unit including:
a housing forming a filter chamber including means for conducting dust laden air into said chamber;
a porous media barrier filter element in said filter chamber, said filter element including a first planar filter panel, said filter panel defining at least in part a clean air chamber for receiving air which has flowed through said filter element, said clean air chamber having an opening for discharging clean air from said clean air chamber;
means for supporting said filter element in said filter chamber;
means forming a flow tube opening into said clean air chamber for conducting clean air from said clean air chamber and away from said filter element, wherein said clean air chamber is tapered inwardly with increasing distance from said flow tube opening, whereby the clean air chamber discharge velocity is constant throughout the clean air chamber length as measured inwardly from said flow tube opening;

reverse flow air jet nozzle means disposed downstream of said filter element with respect to the direction of flow of clean air through said filter element, said nozzle means being in communication with a source of pressure air and including a plurality of orifices arranged in a predetermined pattern for discharging a shaped jet of pressure air for contact with the walls of said flow tube, said nozzle means being arranged in such a way as to generate a jet having a cross-sectional shape conforming to the cross-sectional shape of said flow tube and for inducting a relatively large volume of substantially ambient pressure air into said flow tube in a direction opposite to the direction of flow of clean air out of said flow tube to backflush said filter element with a quantity of combined induced and jetted pressure air.

17. A porous media barrier type oval shaped filter element for use with a reverse jet filter cleaning system, wherein:

said oval shaped filter element includes a filter media being operably adapted for filtering air passing in a direction through the media from outside to inward of the media into a clean air flow chamber and having a flow area for air to be filtered substantially the same as the maximum number of cylindrical filter elements which can be contained in the same dimensional envelope as said oval filter element wherein said cylindrical filter elements have an outer diameter the same as the width of said oval filter element, and said oval filter element has a cross sectional flow area for flow entering into said clean air flow chamber defined by said oval filter element of at least approximately 1.4 times the cumulative cross sectional flow area of the corresponding clean air flow chambers formed by said maximum number of cylindrical filter elements, said clean air flow chamber being open ended to receive reverse jet flow from a reverse jet filter cleaning system with which the filter is to be utilized.

18. The filter element set forth in claim 17, wherein:
said filter media for said oval filter element and said cylindrical filter elements comprises a pleated porous paper, the pleat spacing and pleat width being substantially the same for all of said filter elements.

19. A porous media barrier type filter element, which comprises:

a planar first pleated filter panel;

means cooperating with said first filter panel for forming a clean air flow chamber exposed to the interior surface of said filter panel, said chamber having an open end for the exiting of clean air at which the height of said first filter panel is 1.25 to 7.5 times the width of said flow chamber opening, wherein the pleats of said first filter panel run parallel to the direction of clean air flow in said flow chamber toward said open end;

and a flow tube positioned juxtaposed and surrounding said flow chamber opening and in extending communication therewith, said flow tube being substantially the same size and shape as said flow chamber opening.

20. The filter element as claimed in claim 19, wherein said flow chamber tapers inwardly in the direction away from said flow chamber opening whereby the flow tube discharge velocity is constant over the height of said flow tube.

21. The filter element as claimed in claim 19, including a planar second pleated filter panel spaced apart from said first filter panel to form a part of said flow chamber.

22. The filter element as claimed in claim 21, including a divider structure disposed between said first and second filter panels to divide said flow chamber into a plurality of subchambers

* * * * *

UNITED STATES PATENT AND TRADEMARK OFFICE
CERTIFICATE OF CORRECTION

PATENT NO. : 4,661,131　　　　　　　　　　　　Page 1 of 2
DATED　　　 : April 28, 1987
INVENTOR(S) : D. Franklin Howeth It is certified that error appears in the above-identified patent and that said Letters Patent is hereby corrected as shown below:

Col. 1, line 59　　　　　　　　　　　"pressur" should be --pressure--.

Col. 2, line 8　　　　　　　　　　　the following data is missing:
　　Furthermore, selective to pleated media planar filters with high pressure pulse jet cleaning, various added means are applied to direct loosened particulate away from the filter media other than with excess volumes of reverse flushing air. One prior art panel filter cleaning Col. 4, line 63　　　　　　　　　　　"enery" should be --energy--.

Col. 5, line 10　　　　　　　　　　　"configurations" should be
--configuration--.

Col. 6, line 7　　　　　　　　　　　"and an a" should be --and a--.

Col. 6, line 10　　　　　　　　　　　"14" should be --24--.

Col. 7, line 10　　　　　　　　　　　"suitablye" should be --suitably--

Col. 8, line 2　　　　　　　　　　　"plate" should be --plates--.

Col. 8, line 2　　　　　　　　　　　"suitable" should be --suitably--.

UNITED STATES PATENT AND TRADEMARK OFFICE
CERTIFICATE OF CORRECTION

PATENT NO. : 4,661,131

DATED : April 28, 1987

INVENTOR(S) : D. Franklin Howeth

It is certified that error appears in the above-identified patent and that said Letters Patent is hereby corrected as shown below:

| | |
|---|---|
| Col. 9, line 7 | "plate" should be --plates--. |
| Col. 9, line 31 | "defined" should be --delimited--. |
| Col. 9, line 38 | "orifics) should be --orifices--. |
| Col. 12, line 39 | "incldes" should be --includes-- |
| Col. 12, line 43 | "heat" should be --head--. |
| Col. 12, line 44 | "heat" should be --head--. |
| Col. 13, line 41 | "shaped" should be --selected--. |
| Col. 13, line 42 | "city" should be omitted. |
| Col. 14, line 20 | "partial" should be --parallel--. |

Signed and Sealed this

Twenty-fifth Day of August, 1987

Attest:

DONALD J. QUIGG

Attesting Officer

Commissioner of Patents and Trademarks